United States Patent [19]
Knapp

[11] 3,964,799
[45] June 22, 1976

[54] PIVOT PIN ADAPTER ASSEMBLY

[76] Inventor: Peter A. Knapp, 17 Albany St., Wollaston, Mass. 02170

[22] Filed: June 9, 1975

[21] Appl. No.: 585,180

[52] U.S. Cl. ................................... 308/2 R; 308/15
[51] Int. Cl.² ........................................... F16C 7/00
[58] Field of Search ............... 308/2 R, 1 R, 15, 22; 92/118

[56] References Cited
UNITED STATES PATENTS

| | | | |
|---|---|---|---|
| 2,854,958 | 10/1958 | Wood et al. | 92/118 X |
| 3,469,892 | 9/1969 | Langstroth | 308/15 X |

Primary Examiner—M. H. Wood, Jr.
Assistant Examiner—Gene A. Church
Attorney, Agent, or Firm—Thompson, Birch, Gauthier & Samuels

[57] ABSTRACT

An adapter assembly for use with the pivot pin of a conventional Leach 2R-1006 type operating cylinder. The adapter assembly obviates the need for stocking three different types of replacement pivot pins. Instead of three types, only one type is necessary because it can be combined with the adapter assembly to provide functional equivalents of the other two types.

Specifically, the adapter assembly is used with a conventional Leach 2R-1916 pivot pin which has an axially bored, internally threaded end. The adapter assembly includes a stepped cylindrical adapter element having a head portion and a contiguous, axially aligned, reduced diameter neck portion. The adapter element has a smooth axial bore throughout its length. The adapter assembly also includes a bolt which is inserted into the head portion end and through the axial bore of the adapter element and which is threadably engaged into the threaded end of the pivot pin. By use of the adapter assembly, a 2R-1916 pivot pin can be converted into the functional equivalent of a 2R-1408 pivot pin or a 2R-2036 pivot pin.

10 Claims, 5 Drawing Figures

PIVOT PIN ADAPTER ASSEMBLY

BACKGROUND OF THE INVENTION

This invention is designed for use with a conventional leach 2R-Packmaster rear end loading refuse collecting vehicle. These vehicles are manufactured by Leach Company, Harrison and Packer Aves., Oshkosh, Wis. Such vehicles employ four 2R-1006 or 2R-1006A operating cylinders which are pivotally attached to the packer and carrier plates. It is the pivot pins for these operating cylinders with which this invention is concerned.

Depending upon the year of manufacture and upon slight variations between models, these operating cylinders are pivotally attached to frame or other elements by three types of pivot pins which are designated by Leach Company as Part Nos. 2R-1916, 2R-2036, and 2R-1408. After extended periods of use, these pivot pins wear out or break and must be replaced. Thus, the repair shop must stock or special order three different types of pivot pins, all of which are at times not readily available from Leach Company.

It is an object of this invention to provide an adapter assembly which can be used with pivot pin No. 2R-1916 to produce the functional equivalent of pivot pin Nos. 2036 and 1408.

It is a further object of this invention to provide a unique combination of an adapter assembly and pivot pin No. 2R-1916 which produces functional equivalents of all three such pivot pins.

It is a further object of this invention to provide an adapter assembly which can be used with any type of cylindrical pivot pin which has an axially bored, internally threaded end, to produce the functional equivalent of a pivot pin which has a circumferentially grooved or transversely apertured end for receiving a pin retainer to prevent axial displacement of the pivot pin.

It is a still further object of this invention to provide an adapter assembly which is quite inexpensive to make and store and which will completely obviate the need for repair shops to stock or order pivot pin Nos. 2036 and 1408.

SUMMARY OF THE INVENTION

The preferred embodiment of this invention comprises an adapter assembly intended for use with a Leach pivot pin No. 1916 which has an axially bored, internally threaded end. The preferred adapter element of the assembly has a cylindrical head portion and a reduced diameter cylindrical neck portion. An axial bore extends throughout the length of the adapter element. The assembly further includes a bolt and a lock washer.

The lock washer is placed on the bolt shank and the bolt is inserted into the head portion of the adapter element and is screwed tightly into the threaded end of pivot pin No. 1916. The conventional U-shaped pin retainer No. SR-10013 is fitted into the reduced diameter neck portion of the adapter element and the pin retainer is bolted to a fixed adjacent frame element. This arrangement locks the pivot pin against axial movement in either direction.

The just-described use of the adapter assembly can be undertaken to replace a worn or broken 2R-2036 or 2R-1408 pivot pin. If the pivot pin to be replaced is a 2R-1916 pin, the adapter assembly may be optionally used.

DESCRIPTION OF THE PREFERRED EMBODIMENT

Figure 1:
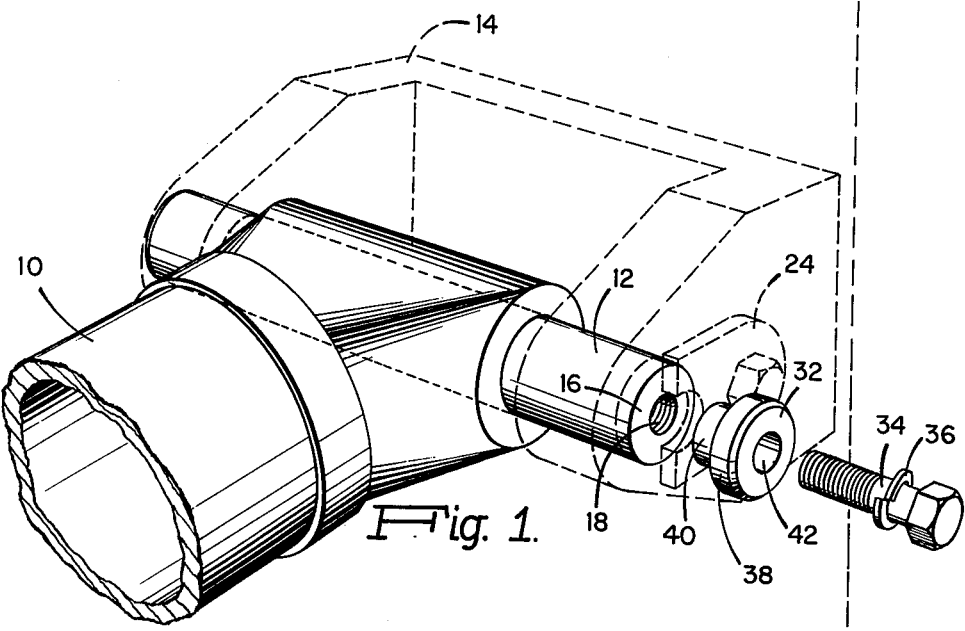
FIG. 1 is a perspective exploded view of the conventional Leach 2R-1006 operating cylinder which is pivotally attached by use of the invention to a frame-mounted yoke or channel.

FIG. 1 shows the end portion of the cylinder 10 of a conventional Leach 2R-1006 operating cylinder. The end portion is transversely bored and a pivot pin 12, corresponding to a Leach 2R-1916 pivot pin, is inserted through the end portion bore. The dotted lines show a mounting yoke 14 which is intended to represent a variety of typical bracket elements to which such operating cylinders can be pivotally attached, as for example to a Leach carrier plate 2R-1090.

Conventional pivot pin 12 has a smooth cylindrical exterior surface and has one end 16 which has an axial bore 18 with internal threads to facilitate endwise removal.

Figure 4:
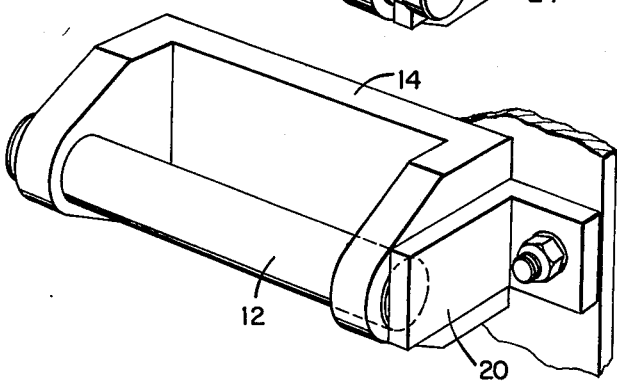
FIG. 4 is a perspective view of conventional Leach pivot pin 2R-1916 which is locked in place by conventional Leach pin retainer 2R-1917.

FIG. 4 shows the identical pivot pin 12 which is held in yoke 14 by an L-shaped retaining bracket 20, corresponding to Leach pin retainer 2R-1917, and by other retaining means (unshown) at the other end of the pivot pin 12. Retaining bracket 20 is bolted to an adjacent structural member and holds the pivot pin against axial movement in one direction.

Figure 3:
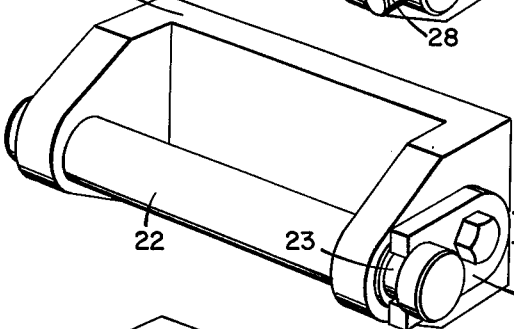
FIG. 3 is a perspective view of conventional Leach pivot pin 2R-2036 which is locked in place by conventional Leach pin retainer SR-10013.

FIG. 3 shows a different type of pivot pin 22, corresponding to a Leach 2R-2036 pivot pin. Pin 22 has a reduced diameter neck portion 23 near one end and is held in yoke 14 by a U-shaped pin retainer 24, corresponding to Leach pin retainer SR-10013, which straddles neck portion 23. Pin retainer 24 is bolted to yoke 14 or to an adjacent structural member and holds the pivot pin against axial movement in either direction.

Figure 2:
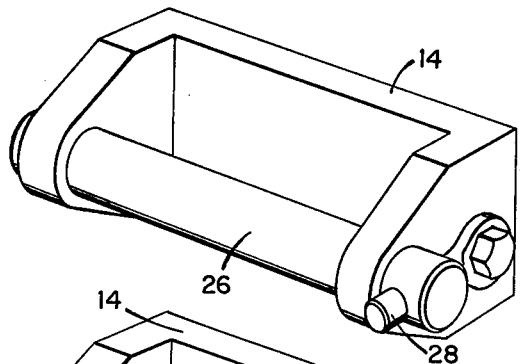
FIG. 2 is a perspective view of conventional Leach pivot pin 2R-1408 which is locked in place by conventional Leach pin retainer SK-426.

FIG. 2 shows another different type of pivot pin 26, corresponding to a Leach 2R-1408 pivot pin. Pin 26 has a transverse bore near one end and is held in yoke 14 by a pin retainer 28, corresponding to Leach retaining pin SK-426, which extends through the transverse bore of pivot pin 26. Pin retainer 28 is bolted to yoke 14 or to an adjacent structural member and holds the pivot pin against axial movement in either direction.

FIGS. 2–4 show the conventional Leach arrangements for pivotally attaching the operating cylinder to another element, such as a carrier plate. It is one of the purposes of this invention to obviate the need for a repair shop to maintain a stock of pivot pins 12, 22 and 26, and pin retainers 20, 24 and 28. Instead, a repair shop could maintain a stock solely of pivot pins 12, pin retainers 24, and the adapter assemblies of this invention, the latter of which will now be described in detail.

Figure 5:
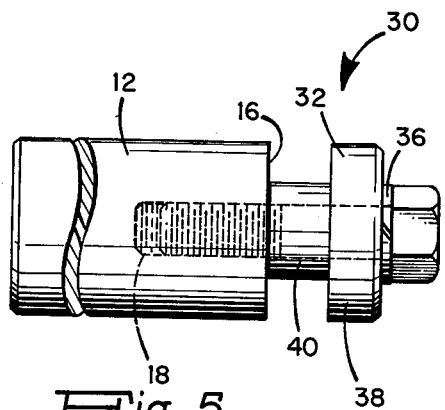
FIG. 5 is an elevation of conventional Leach pivot pin 2R-1916 combined with the adapter assembly of this invention.

The adapter assembly 30 is shown assembled in FIG. 5 and is shown disassembled in FIG. 1 Preferably, the assembly consists of three elements, an adapter element 32, an externally threaded bolt 34, and a lock washer 36.

Adapter element 32 has a stepped cylindrical shape in which its large diameter head portion 38 is joined to a smaller or reduced diameter neck portion 40. Both portions are axially aligned and are preferably formed from a single piece of stock, as by a lathe. Alternatively, the two portions could be independent pieces. A smooth axial bore 42 extends throughout the length of adapter element 32.

The preferred dimensions of adapter element 32 are as follows: the overall axial length is 1 inch; the axial length of neck portion 40 is ½ inch; the axial length of head portion 38 is ½ inch; the diameter of neck portion 40 is 1 inch; the diameter of head portion 38 is 1½ inch; and the diameter of axial bore 42 is ½ inch.

Bolt 34 is preferably a 2 inch long, ½ inch diameter hex head capscrew having an NC 18 thread. Bolt 34 is also preferably chrome plated and has very high strength. Obviously, these characteristics are preferred, but are not specifically required. The lock washer 36 preferably has a ½ inch opening.

In operation, when any one of pivot pins 12, 22 or 26 breaks or wears out, it is removed by the repair shop and replaced with a new pivot pin 12 to which an adapter assembly 30 has been previously attached. That is, lock washer 36 is inserted on the shank of bolt 34, and the bolt is inserted into the head portion end of adapter element bore 42 and into threaded hole 18 of the pivot pin. Then, the adapter assembly is screwed tightly against the end of pivot pin 12 (see FIG. 5).

To hold the pivot pin in place, a U-shaped pin retainer 24 is positioned to straddle neck portion 40 and is bolted to yoke 14. This arrangement prevents the pivot pin from moving axially in either direction.

It will be appreciated that the combination of pivot pin 12, adapter assembly 30, and pin retainer 24 is suitable as a replacement for any one of three pivot pin-pin retainer combinations 12–20, 22–24, or 26–28. This is an accomplishment of considerable economic importance to a repair shop and also results in a savings of time and space.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. For use with a cylindrical pivot pin having an axially bored, internally threaded end, an adapter assembly comprising:
   a. a stepped cylindrical adapter element having a head portion and a contiguous, axially aligned, reduced diameter neck portion, said adapter element having an axial bore throughout its entire length; and
   b. a bolt having an externally threaded shank sized to fit the pivot pin threaded end, said shank having a length greater than the axial length of said adapter element;
   c. said bolt being inserted into the head portion end and through the axial bore of said adapter element and being threadably engaged into the threaded end of the pivot pin.

2. The adapter assembly of claim 1 wherein said adapter element head portion and said adapter element neck portion are fixed together.

3. The adapter assembly of claim 1 wherein said adapter element head portion and said adapter element neck portion are unattached.

4. The adapter assembly of claim 1 wherein the diameter of said adapter element head portion and the diameter of the pivot pin are approximately equal.

5. The adapter assembly of claim 1 further including a lock washer being positioned on said bolt shank between the head of said bolt and said adapter element head portion.

6. The adapter assembly of claim 1 wherein the axial length of said adapter element head portion and the axial length of said adapter element neck portion are substantially equal.

7. The adapter assembly of claim 1 wherein said adapter element is a one-piece component.

8. The adapter assembly of claim 1 wherein said adapter element axial bore is smooth.

9. In combination, a cylindrical pivot pin and an adapter assembly comprising:
   a. a cylindrical pivot pin having an axially bored, internally threaded end; and
   b. an adapter assembly including:
      i. a stepped cylindrical adapter element having a head portion and a contiguous, axially aligned, reduced diameter neck portion, said adapter element having an axial bore throughout its entire length; and
      ii. a bolt having an externally threaded shank sized to fit said pivot pin threaded end, said shank having a length greater than the axial length of said adapter element;
      iii. said bolt being inserted into the head portion end and through the axial bore of said adapter element and being threadably engaged into said threaded end of said pivot pin.

10. The combination of claim 9 further including a lock washer being positioned on said bolt shank between the head of said bolt and said adapter element head portion.

* * * * *